United States Patent [19]

Aso et al.

[11] Patent Number: 4,877,935
[45] Date of Patent: Oct. 31, 1989

[54] WIRE CUT ELECTRODISCHARGE MACHINE TOOL

[75] Inventors: Toshiyuki Aso, Hino; Tamotsu Ishibashi, Hachioji, both of Japan

[73] Assignee: Fanuc Ltd., Yamanashi, Japan

[21] Appl. No.: 196,198

[22] PCT Filed: Aug. 31, 1987

[86] PCT No.: PCT/JP87/00643
§ 371 Date: Jun. 30, 1988
§ 102(e) Date: Jun. 30, 1988

[87] PCT Pub. No.: WO88/01550
PCT Pub. Date: Mar. 10, 1988

[30] Foreign Application Priority Data

Aug. 30, 1986 [JP] Japan ............................... 61-202740

[51] Int. Cl.⁴ ................................................. B23P 1/08
[52] U.S. Cl. ................................ 219/69.12; 219/69.15
[58] Field of Search ............... 219/69 W, 69 M, 69 G, 219/69 E

[56] References Cited

U.S. PATENT DOCUMENTS

| 4,347,423 | 8/1982 | Katsube et al. | 219/69 W |
| 4,350,864 | 9/1982 | Janicke et al. | 219/69 W |
| 4,523,074 | 6/1985 | Okuda | 219/69 W |
| 4,608,475 | 8/1986 | Inoue | 219/69 W |
| 4,689,462 | 8/1987 | Goto | 219/69 W |

FOREIGN PATENT DOCUMENTS

| 0010130 | 3/1981 | Japan | 219/69 W |
| 008213/ | 7/1981 | Japan | 219/69 W |
| 0102432 | 8/1981 | Japan | 219/69 W |
| 0056730 | 4/1983 | Japan | 219/69 W |
| 2080177 | 2/1982 | United Kingdom | 219/69 W |

Primary Examiner—M. H. Paschall
Attorney, Agent, or Firm—Armstrong, Nikaido, Marmelstein, Kubovcik & Murray

[57] ABSTRACT

A wire cut electrodischarge machine tool, wherein when the electrode wire breaks during electrodischarge machining, the wire disconnected end is cut and repaired at a repair position far from the electrodischarge machining region by a cutter means, following movement of the wire end is prevented when the cutter is retracted, the electrode wire is automatically laid between upper and lower heads having built-in wire guides, and thus electrodischarge machining on the workpiece is automatically prepared for.

3 Claims, 4 Drawing Sheets

WIRE CUT ELECTRODISCHARGE MACHINE TOOL

TECHNICAL FIELD

The present invention relates to a wire cut electrodischarge machine tool, more particularly to a wire cut electrodischarge machine tool which, when disconnection of an electrode wire occurs during the electrodischarge machining, repairs the disconnected end at a repair position apart from the electrodischarge machining region, then automatically lays the electrode wire between upper and lower heads having built-in wire guides to automatically prepare for the start of electrodischarge machining on the workpiece.

BACKGROUND ART

There has already been proposed a wire cut electrodischarge machine tool using an electrode wire of a wire shape or strip shape, which is provided with, for times when the electrode wire breaks during the machining, a clamp mechanism for clamping an electrode wire portion on a feeding side and an electrode wire feed mechanism for moving the electrode wire so that the end of electrode wire portion on the feed side coincides with a preset position and which thus enables automation of the insertion of the electrode wire portion of the feed side to the work (See Japanese Unexamined Patent Publication No. 56-3146). This known wire cut electrodischarge machine tool confirms the clamping of the disconnected end of the electrode wire by the above clamping mechanism, then refeeds the said wire disconnected end toward the electrode wire inserting hole of the work, then pulls back the electrode wire disconnected end projecting from the wire inserting hole of the work, holding it by a motor-driven electrode drawing mechanism, lays the electrode wire between upper and lower heads provided above and below the electrodischarge machining region, and thus prepares for restart of the wire cut electrodischarge machining. This known wire cut electrodischarge machine tool controls the wire cut electrodischarge machining process and the aforementioned machining restart preparation process at the time of electrode wire disconnection by means of a CNC device (computer numeral control device) using a microcomputer.

However, in a wire cut electrodischarge machine tool due to the electrodischarge action between the electrode wire and workpiece, or the tilted running of the electrode wire during taper hole machining, when the electrode wire breaks, the disconnected portion tends to be curved or rough surfaced. Therefore, often it is impossible to correctly refeed the disconnected electrode wire end through the wire inserting hole of the workpiece without some repair thereof.

Therefore, it has been considered necessary to use the afore-mentioned CNC device to automatically join the wire and prepare for restart of machining by eliminating curved portions of the electrode wire disconnected portion and roughed surface portions and further by preventing the removed portion from remaining on the work.

DISCLOSURE OF THE INVENTION

It is an object of the present invention to provide a wire cut electrodischarge machine tool which is provided with a means for automatically repairing disconnected electrode wires and which can satisfy this need.

The present invention provides, for example, as shown in FIG. 1, a wire cut electrodischarge machine tool which comprises a work table 24 for mounting a workpiece W fed automatically in an X-Y plane (horizontal plane orthogonal to the paper plane of FIG. 1), an electrode wire feeding device for feeding an electrode wire 14 through an electrodischarge machining region with respect to the workpiece W, upper and lower heads 22, 26 provided above and below the work table and having built-in wire guides, and an automatic electrode wire laying mechanism which used the jet flow of the machining fluid to automatically feed the wire between the upper and lower heads and automatically prepare for the start of machining, the wire cut electrodischarge machine tool being provided with, as shown in FIGS. 2A and 2B, an electrode wire feed mechanism 40 for pulling back the disconnected end of the electrode wire, which broke at the electrodischarge machining region during electrodischarge machining, from the electrodischarge machining region and for holding the disconnected end of the electrode wire in a drawable manner, a wire end detecting means for detecting the disconnected end of the electrode wire outside of the electrodischarge machining region, a relative transfer means for moving the disconnected end of the electrode wire to a predetermined electrode wire repair position relatively separate from an electrodischarge machining region according to the detection of the disconnected end of the electrode wire by the wire end detection means and for returning it from the repair position, a cutter means for cutting the disconnected end of the electrode wire at the electrode wire repair position by reciprocal motion, and a wire supporting plate for preventing the electrode wire disconnected end from being dragged by the cutter and following it during the cutter retraction, thus resolving or improving on problems in the conventional apparatuses mentioned above.

In accordance with the present invention, when the electrode wire breaks during wire cut electrodischarge machining, the defective portion of the disconnected end is completely removed and only then the wire connected and laid between the upper head and lower head. Moreover, in spite of the cutting action being by reciprocative motion of the cutter, motion of the electrode wire end to the side following the cutter can be prevented completely, so there is the effect that even with automation of the connecting and laying operation, the wire can be reliably laid between the upper head and lower head and restart of electrodischarge machining can be achieved error free. Further, the defective portions of the disconnected end are eliminated outside of the electrodischarge machining region, so it is possible to eliminate the liability of the removed wire remaining on the workpiece surface and disconnection occurring again after restart of machining due to the remaining wire. Due to the above, it is possible to achieve smooth CNC control for wire cut electrodischarge machining action.

BEST MODE FOR CARRYING OUT THE INVENTION

Figure 1:
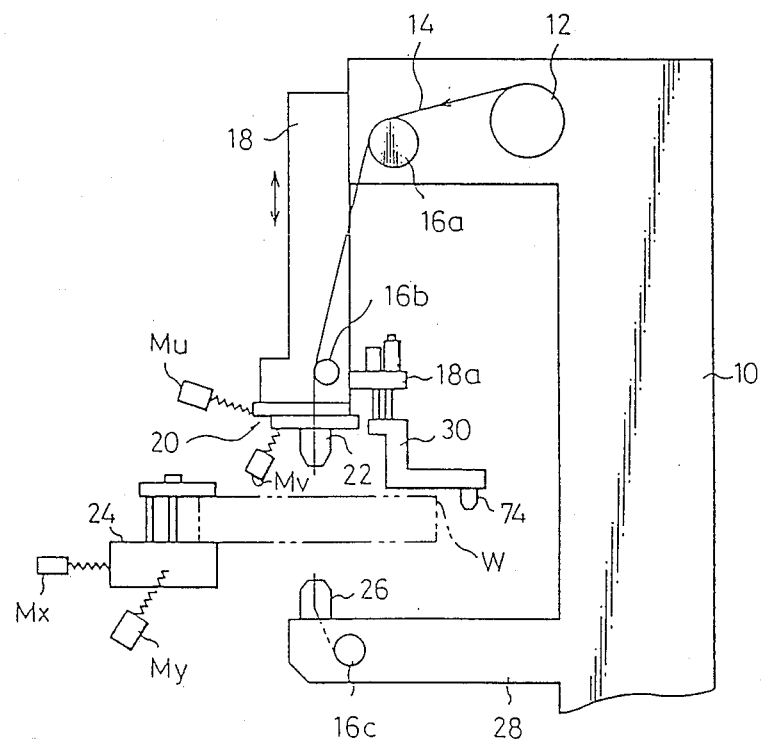
FIG. 1 is a structural view showing the structure of an embodiment of a wire cut electrodischarge machine tool for the wire cut electrodischarge machining method of the present invention.

FIG. 1 is a schematic structural drawing showing the structure of an embodiment of a wire cut electrodischarge machine tool according to the present invention.

In FIG. 1, the wire cut electrodischarge machine tool has a motor-driven electrode wire feed device 12 on a machine frame 10. The electrode wire 14 fed from the electrode wire feed device 12 passes through a guide roller 16a and a guide roller 16b on a Z-axis column 18 to reach an upper head 22, with a built-in upper guide, which is mounted on a tapering table device 20 provided at the lower end of the Z-axis column 18, then passes through the electrodischarge machining region with the workpiece W, clamped by the X, Y-axis work table 24 in a horizontal plane orthogonal to the paper plane of FIG. 1, to the lower head 26, with a built-in lower guide, and passes through a guide roller 16c on an arm 28 to a suitable withdrawing device. Said apparatus horizontally moves the workpiece W with respect to the electrode wire 14 in accordance with control motion of the X-, Y-axis work table 24. During this time, it engages in wire cut electrodischarge machining action passing through the required locus in the electrodischarge machining region.

Moreover, even if the electrode wire 14 breaks during the wire-cut electrodischarge machining due to unsuitable machining conditions etc., there is the repair unit 30 for repairing the disconnected portion of said electrode wire 14. The structure and action of this repair unit 30 will be described in detail later. In FIG. 1, the afore-mentioned X-, Y-axis work table 24 is constructed to be movable in both the X- and Y- axial directions in the horizontal plane by an X-axis drive motor $M_X$ and a Y-axis drive motor $M_Y$. These X-axis drive motor $M_X$ and Y-axis drive motor $M_Y$ are controlled by the CNC device shown in FIG. 4. Similarly, the tapering table device 20 is constructed to be similarly movable in the horizontal plane by a U-axis drive motor $M_U$ and a V-axis drive motor $M_V$. Thus, the table is capable of imparting a tilted running path to the electrode wire 14 passing through the upper head 22 mounted on the tapering table 20, in the electrodischarge machining region with the workpiece, to enable tapering. These U-axis drive motor $M_U$ and V-axis drive motor $M_V$ are also controlled in operation by the CNC device shown in FIG. 4.

Figure 2A:
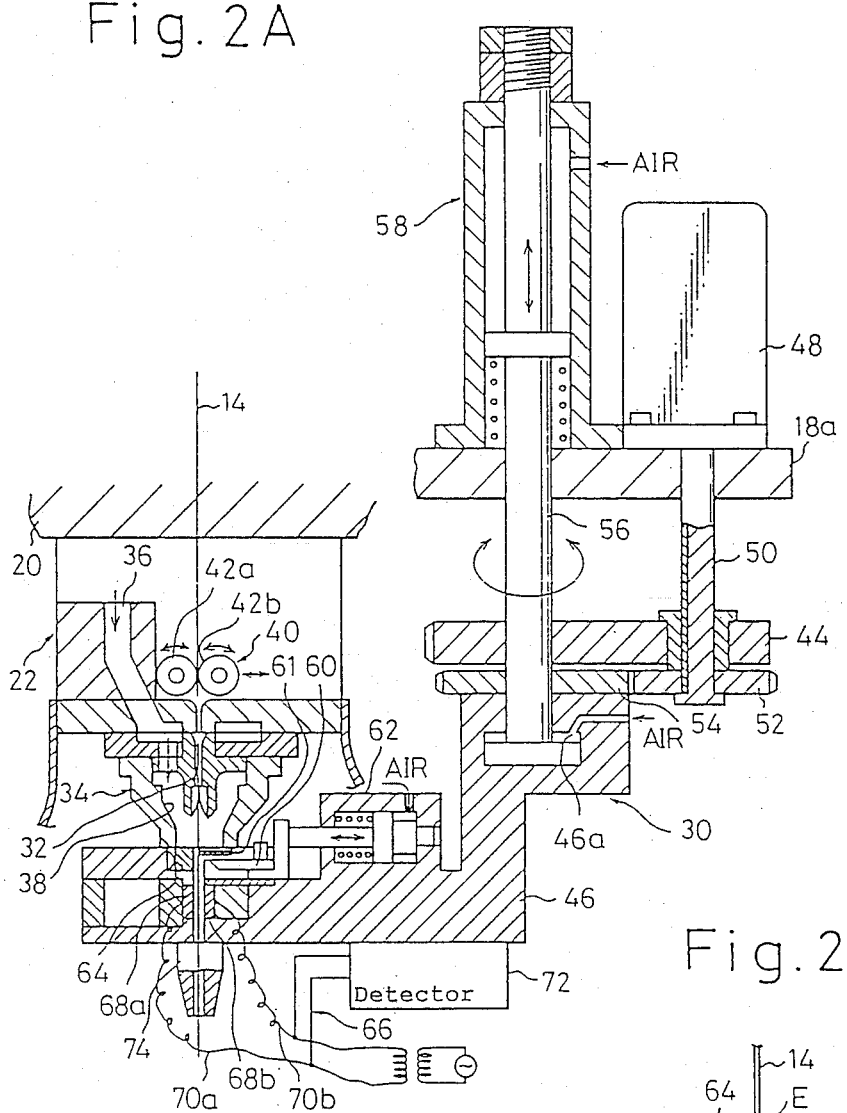
FIG. 2A is a sectional view showing an example of the structure of an upper head and repair unit in said apparatus.

Referring to FIG. 2A, this shows the detailed structure of the upper head 22 and repair unit 30. The latter repair unit 30 is shown in the state turned and positioned from the usual shunting position shown in FIG. 1 to the repair position just under the upper head 22. In FIG. 2A, the upper head 22 has an upper guide 32 in which is inserted the electrode wire 14 and has an upper nozzle 34 encircling said upper guide 32.

On this upper nozzle 34 is formed a flow path 38 for pressurized electrodischarge machining fluid introduced from a machining fluid port 36. The electrodischarge machining fluid flowing in the flow path 38 promotes the electrodischarge machining action and eliminates the machining scraps during usual wire cut electrodischarge machining. Also, as will be described later, the jet stream of said electrodischarge machining fluid is used to lay the electrode wire 14 from the upper head 22 to the lower head 26 (FIG. 1). Note that the introduction of the electrodischarge machining fluid from outside of the machine to the machining fluid port 36 may be performed by known means, so will not be described in detail here. Further, in the upper head 22 is provided an electrode wire feed mechanism 40. This electrode wire feed mechanism 40 has the structure, for example, disclosed in the afore-mentioned Japanese Unexamined Patent Publication No. 56-3146 as the wire feed mechanism 9. When the electrode wire 14 breaks, it can pull back and clamp the disconnected end from the electrodischarge machining region of the workpiece W (FIG. 1), feed the disconnected end of the electrode wire 14 from the afore-mentioned pull-back clamped position to the wire cutter, described later, provided in the repair unit 30, and cut away the disconnected portion. Note that this electrode wire feed mechanism 40, during usual wire cut electrodischarge machining, allows free running of the electrode wire 14 under a set tension, that is, running from the upper head 22 to the lower head 26 (FIG. 1), by moving, among the two rollers 42a and 42b, the latter roller 42b from the former roller 42a in the horizontal direction. During this time, electrodischarge machining is performed in the electrodischarge machining region with the workpiece W. Further, while not shown in FIG. 1 and FIG. 2A, a power terminal for providing electrodischarge machining power to the electrode wire 14 and a disconnection detecting mechanism for detecting occurrence of disconnection of the electrode wire 14 through changes in tension are provided near the upper head 22. Use may be made of known devices for these and thus they will not be described here.

On the other hand, the repair unit 30 is provided with an upper bracket 44 and a lower swivel bracket 46. The former upper bracket 44 moves only up and down with respect to an arm 18a which overhangs laterally from the Z-axis column 18 (FIG. 1). The latter swivel bracket 46 receives rotational drive force by a rotating a cylinder 48 through its output shaft 50, pinion 52, and driven gear wheel 54 so as to swivel about its output shaft 56 with respect to the upper bracket 44 between a position just under the upper head 22 and the afore-mentioned shunting position (state shown in FIG. 1). Here, the upper bracket 44 and the lower swivel bracket 46 are formed integrally with a direct-drive air cylinder 58 together with the above output shaft 56, which forms its piston rod, so as to be capable of up-down motion. At the bottom movement position, the swivel action of the lower swivel bracket 46 is performed. When the lower swivel bracket 46 swivels to the shunting position, it is pulled up to the top movement position so the repair unit 30 does not interfere with the upper head 22 during usual electrodischarge machining action. Note that an air chamber 46a of the lower swivel bracket 46 is formed so that, when the repair unit 30 is just under the upper head 22, compressed air is introduced into the air chamber 46a to bring the unit 30 into close contact with the upper nozzle 34 of the upper head 22 and prevent leakage of the machining fluid jet flow.

Figure 2B:
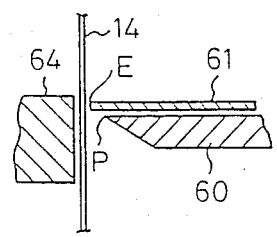
FIG. 2B is an enlarged sectional view of main parts of the cutter portion.

Further, the lower swivel bracket 46 is provided with a cutter 60 which moves back and forth by an air cylinder device 62 for a cutting action. As clear from FIG. 2B, an electrode wire receiving plate 61, fixed unrelated to the cutter motion, is arranged near the top of the cutter so that the end edge E of the receiving plate is positioned ahead from the cutting edge P upon cutter retraction, namely, is positioned at a point close to the wire 14. This cutter 60 and receiving plate 61 are formed so that when the unit 30 is just under the upper head 22, they cooperate with the cutter receiving stand 64 and perform a cutting action upon the advance of the cutter actuated by the actuation of said air cylinder device 62. Upon retraction of the cutting edge, the end edge E of the receiving plate 61 supports the electrode wire 14 whereby the electrode wire end does not follow the cutter and bend to the side.

The lower swivel bracket 46 is provided with a wire end detecting device 66 for detecting the disconnected end of the electrode wire 14. This wire end detecting device 66 is structured for detecting the conducting disconnected end of the electrode wire 14 by, for example, the electric contact detecting method. It is formed of a pair of conductive detecting plates 68a, 68b provided opposingly at positions near the pull-back passage when the disconnected portion of the electrode wire 14 is pulled back by the electrode wire feed mechanism 40 just under the upper head 22, detection voltage impressing circuits 70a and 70b which impress AC voltage from an AC power source to the detecting plates 68a and 68b, and a detector 72 for detecting the voltage drop upon contact of the disconnected end of the electrode wire 14 with said detecting plates 68a and 68b through the detection voltage impressing circuits 70a and 70b. The detecting plates 68a and 68b are electrically insulated from the surroundings by an electric insulation board.

The lower swivel bracket 46 is further provided with a jet nozzle 74, which jet nozzle 74, after the defective portion of the disconnected end of the electrode wire 14 has been removed, uses a jet of machining fluid so that, when laying the electrode wire 14 once again from the upper head 22 to the lower head 26 (FIG. 1), it guides the electrode wire 14 to the lower head 26.

Figure 3A:
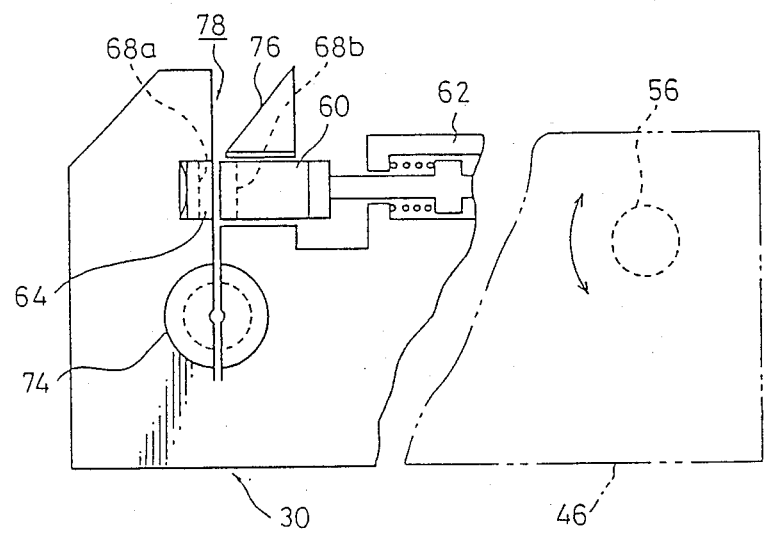
FIG. 3A is an explanatory top view showing said apparatus in the state with the electrode wire supporting plate removed.

FIG. 3A is a horizontal sectional view of the lower bracket 46 in the state with the electrode wire supporting plate 61 removed. It shows the positional relation of the afore-mentioned cutter 60, conductive detecting plates 68a and 68b of the wire end detecting device 66, and the jet nozzle 74 and an electrode wire introducing port 78 having a slanted wall 76 formed on the lower bracket 46. That is, when the lower bracket 46 swivels around its rotation shaft 56 to come just under the upper head 22, the electrode wire 14 hanging down from the upper head to the lower head 26 (FIG. 1) can be introduced from the introducing port 78, opened wide by the slanted wall 76. Further, the conductive detecting plates 68a and 68b for detecting the disconnected end of the electrode wire 14 and the cutter 60 and cutter receiving stand 64 are mounted over each other, but the jet nozzle 74 is mounted at a position shifted from the cutter 60. Therefore, after repair of the disconnected part of the electrode wire 14 is finished by the wire end detecting device 66 and cutter 60, when the lower bracket 46 is further swiveled by the rotating air cylinder 48 (FIG. 2A), the jet nozzle 74 is positioned just under the electrode wire end clamped by the electrode wire feed mechanism 40 (FIG. 2A) by the completion of the repair.

Figure 3B:
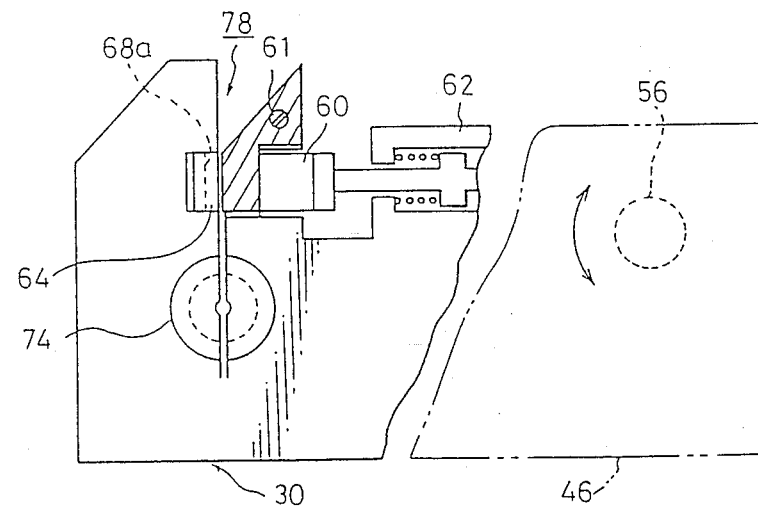
FIG. 3B is an explanatory top view showing said apparatus in the state of the electrode wire supporting plate fixed in place.

FIG. 3B shows the state where the electrode wire supporting plate 61 in FIG. 3A is fixed in place. Namely the electrode wire supporting plate 61 is fixed to the member having the slanted wall 76 by a screw 61.

Figure 4:
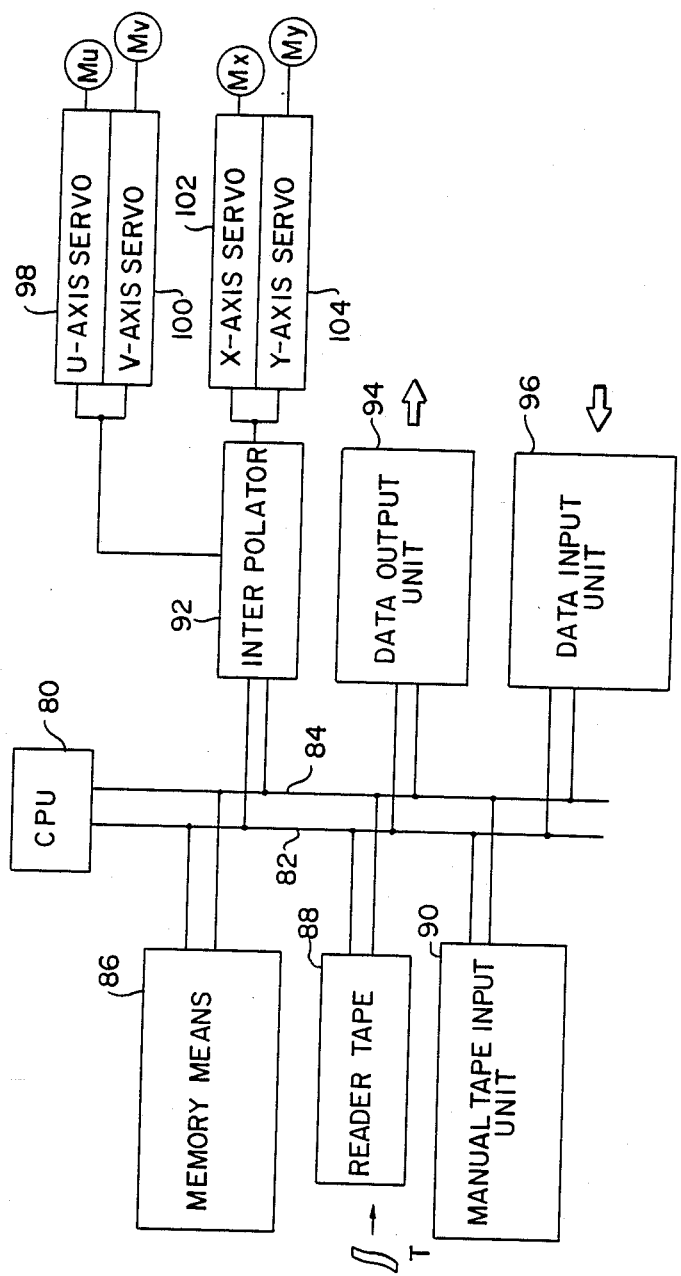
FIG. 4 is a block diagram of a CNC device used for control of the operation of said electrodischarge machine tool.

Next, referring to FIG. 4, this figure is a block diagram showing the structure of the CNC device. The basic structure of this CNC device itself is the same as CNC devices used on wire cut electrodischarge machine tools from the past. That is, the CNC device is provided with a central processing unit (CPU) 80, a memory means 86 connected thereto through an address bus 82 and data bus 84, a tape reader 88, a manual data input unit 90, an interpolator 92, a data output unit 94, and a data input unit 96. The interpolator 92 has connected thereto a U-axis servo circuit 98 and V-axis servo circuit 100 for controlling the U-axis and V-axis driving motors $M_U$ and $M_V$ of the tapering table and an X-axis servo circuit 102 and Y-axis servo circuit 104 for controlling the X-axis and Y-axis driving motors $M_X$ and $M_Y$ of the work table 24.

The machining control data in the wire cut electrodischarge machining is read from a recording medium, for example, a tape PT, through a tape reader 88. According to a control program stored in advance in the recording means 86, the driving motors $M_U$ to $M_Y$ are driven via the interpolator 92 and servo circuits 98 to 104 whereby the work table 24 on which the workpiece is set and the tapering table 20 are actuated and controlled with respect to the constant running electrode wire 14 and the desired wire cut electrodischarge machining is carried out. If various detection signals, including disconnections of the electrode wire 14, are generated during this time, the detection signals are read from the data input unit 96 to the CPU 80. Control signals instructing various kinds of processing, for example, stopping and restarting of the electrode wire feeding device 12, swiveling to the processing position, and swiveling to the shunting position of the repair unit 30, obtained based on these detection signals, are output from the data output unit 94. The manual data input unit 90, in the present invention, is used, for example, in removal of the disconnection portions of the electrode wire 14, when manually inputting repeating signals for activating the cutter 60 by the air cylinder 62 so as to freely change the amount removal.

Below, an explanation will be made of the mode of processing the disconnected end of the electrode wire 14 for preparing for restart of machining in the wire cut electrodischarge machining tool of the present invention.

If disconnection of the electrode wire 14 is detected during the wire cut electrodischarge machining, the detection signal is read from the data input unit 96 to the CNC device. As a result, the feed of the electrode wire by the electrode wire feed device 12 is stopped by a control signal sent from the data output unit 94 under the control of the CPU 80. Also, the wire cut electrodischarge machining is stopped. Next, the disconnected portion of the electrode wire which remains from the workpiece W to the lower head 26 is recovered, and the upper head 22 is lifted up by a predetermined amount by the Z-axis column 18. When suitable lifting of the upper head 22 is detected, the repair unit 30 is swiveled by the operation of the rotating air cylinder 48 to be positioned just under the upper head 22. At this time, the repair unit 30 is swiveled to a first position where the detecting plates 68a and 68b of the wire end detecting device 66 and cutter 60 come just under the upper head 22. The amount of swiveling is decided in accordance with the amount of operation of the rotating air cylinder 48 itself. Next, the pair of rollers 42a and 42b of the electrode wire feeding mechanism 40 are closed and the disconnected electrode wire 14 is drawn back. When the disconnected end of the electrode wire 14 is detected by the wire end detecting device 66, the drawing back action is stopped. When the electrode wire 14 is clamped and stopped by the electrode wire feeding mechanism 40 in this way, the disconnected end of the electrode wire 14 is drawn back from the electrodischarge machining region of the workpiece W, as the CPU 80 operates the X-axis servo circuit 102 and Y-axis servo circuit 104 by the input of wire end detection signal through the interpolator 92 according to a certain program and moves the work table 24 relative to the upper head 22 and repair unit 30, whereby the disconnected end of the electrode wire 14 is moved out of the electrodischarge machining region. Next, to remove the defective portion of the disconnected end of the electrode wire 14, which is warped and rough in surface, the air cylinder device 62 is operated and the disconnected end is cut and removed by the cutter 60, cutter receiving stand 64, and electrode wire supporting plate 61. At this time, in accordance with need, the electrode wire feeding mechanism 40 is actuated to feed the electrode wire 14 to the wire end detecting device 66, whereby the lower part of the electrode wire 14 is cut and removed a number of times and the defective portion can be completely removed.

When a predetermined number of removals of the defective portion of the electrode wire 14 is read by the CPU 80, relative movement of the work table 24 is performed and the upper head 22 is positioned at a predetermined machining restart position. When it reaches this position, the lower bracket 46 of the repair unit 30 is swiveled again to position the center hole of the jet nozzle 74 exactly under the electrode wire 14. That is, it is positioned to the aforementioned second position. At this time, the repair unit 30 is in close contact with the upper nozzle 34 of the upper head 22. Next, the pair of rollers 42a and 42b of the electrode wire feeding mechanism 40 is opened, and the operation of the electrode wire feeding device 12 is restarted. At the same time, at the upper head 22, feeding of the machining fluid is restarted (The machining fluid is stopped at the same time as the electrodischarge machining process is stopped). Using the jet stream of this machining fluid and under the guidance of the jet nozzle 74, the electrode wire 14 is laid to the lower head. In this case, if the machining restart position is above the workpiece W, the electrode wire 14 is laid through the machining restart hole provided in advance on the workpiece W. If the machining restart position is outside of the workpiece W, the electrode wire 14 is laid directly from the upper head 22 to the lower head 26.

When the electrode wire 14 has finished being laid in this way, the repair unit 30 is swiveled away from under the upper head 22 to a shunting position by the action of the rotating cylinder 48. Next, the upper head 22 is again lowered to the electrodischarge machining position by the descent of the Z-axis column 18. Next, if a machining path opened in the workpiece W has already been formed by the electrodischarge machining, the machining program of the X- and Y-axial directions of the work table 24 is restarted for relative movement with the electrode wire 14 along said machining path and the electrode wire 14 is moved to the position where disconnection occurred. After it is moved in this way to the position where disconnection occurred without electrodischarge action, the electrodischarge machining is restarted.

Above, the present invention was explained based on an embodiment, but various other modified embodiments are possible in the scope of the technical idea of the present invention, of course. For example, the repair unit was formed as a structure swiveling by a rotating air cylinder, but it could be formed as a linear moving structure using a motor instead of the swiveling motion. Further the wire end detecting device is not limited to an electrical contact detection means, of course.

We claim:

1. A wire cut electrodischarge machine tool having a work table for mounting a workpiece for automatic feed in X and Y plane directions, an electrode feeding device for feeding electrode wire through an electrodischarge machining region in which said workpiece is mounted, upper and lower heads above and below said work table, respectively, said heads each having a built-in wire guide, an automatic electrode wire feeding mechanism for automatically feeding electrode wire fed from said electrode feeding device between said upper and lower heads, said wire feeding mechanism including jet flowing machining fluid for automatic preparing for the start of machining, said wire cut electrodischarging machine tool being characterized by an electrode wire feeding mechanism for drawing back a disconnected end of the electrode wire disconnected in said electrodischarge machining region during the electrodischarge machining and for holding the disconnected end of said disconnected electrode wire for feed out, a wire end detecting means for detecting a disconnected end of said electrode wire outside of said electrodischarge machining region, a moving means for moving said electrode wire disconnected end to a predetermined electrode wire repair position positioned from said electrodischarge machining region according to detection of a disconnected end of said electrode wire by said wire end detecting means and for returning said disconnected end from said repair position to said electrodischarge machining region, a cutter means for cutting and repairing said electrode wire disconnected end at said electrode repair position, and a wire supporting plate for preventing the wire end after said cutting from following said cutter when said cutter is retracted.

2. A wire cut electrodischarge machine tool as recited in claim 1, further characterized by a jet nozzle for guiding said electrode wire, cut by said cutter means, from one of said heads to the other of said heads by a jet flow of said machining fluid.

3. A wire cut electrodischarge machine tool as recited in claim 1 or 2, wherein said relative moving means is a moving mechanism for moving said work table for mounting said workpiece in X and Y planes with respect to said upper head.

* * * * *